United States Patent Office 2,946,780
Patented July 26, 1960

2,946,780

PREPARATION OF VITAL GLUTEN

Norval G. Barker, Robbinsdale, and Robert W. H. Chang, St. Paul, Minn., assignors to General Mills, Inc., a corporation of Delaware No Drawing. Filed Oct. 16, 1957, Ser. No. 690,425

2 Claims. (Cl. 260—123.5)

This invention relates to a new and useful method for preparing vital wheat gluten.

Wheat gluten is the major protein fraction obtained by separating wheat flour into gluten and wheat starch. This separation is well known and widely practiced commercially. Basically, two principal methods are employed in this separation. One of these is the "dough process" and the other is the "batter process."

In both of the above processes the wheat starch is removed from the gluten by washing. The wet gluten, after the starch has been removed, is a cohesive mass or "cake," which generally contains about one-third gluten and two-thirds water. The gluten will contain about 70 to 90% protein on a dry weight basis in admixture with some fat, ash, fiber, and residual starch.

If the wet native gluten is heated it is readily denatured and once dry will no longer readsorb water to become elastic and cohesive. This denatured gluten is generally referred to as devitalized gluten and has only limited commercial application in food products. For instance, devitalized gluten is not suitable for most food purposes such as in bread or cereals.

Vital gluten on the other hand may be used in many applications where devitalized can not. Vital gluten is used extensively in the preparation of bread, cereals, macaroni and diabetic food. When water is utilized to reconstitute vital wheat gluten, the resulting wheat gluten has substantially the same physical characteristics such as cohesion and elasticity as the wet native gluten.

Various methods have been proposed and are utilized with varying success in the preparation of vital wheat gluten. Among these processes are lyophilization (vacuum—freeze—drying), vacuum tray drying, flash drying, and spray drying. It will be noted that ordinary high temperature air drying is not possible due to the problem of denaturing the gluten.

The principal object of this invention is to teach a new and novel process for preparing wheat gluten from wet native gluten.

Another object of this invention is to teach a process whereby conventional heating methods may be employed to effect a portion of the drying.

The steps employed in the practice of this invention are:

(1) Separation of wet native gluten from wheat flour,
(2) Partial isotonic dehydration of the wet native gluten with sodium chloride, and if a completely dried gluten is desired,
(3) Completion of the drying.

In the partial isotonic dehydration step, dry sodium chloride or a concentrated solution is mixed with the wet native gluten. In this manner the wet native gluten is, in effect, dried by osmosis until equilibrium or the isotonic point is achieved. A greater degree of dehydration can be achieved by employing dry salt since the initial dehydration takes place upon the formation of a concentrated solution of the sodium chloride and further dehydration takes place by osmosis. Accordingly, it is the preferred embodiment of this invention.

The final drying step is greatly facilitated by the fact that one obtains a non-tacky and stable wet gluten from step 2. It is further facilitated by the fact that conventional drying may be employed in the final drying step.

This invention may be illustrated further by reference to the following examples in which all "parts" are expressed as parts by weight and all "percentages" are expressed as percent by weight, unless specified otherwise.

*Example I*

Wet native gluten containing 65–70% moisture and obtained by the dough process described in U.S. Patent 2,555,908 was broken into lumps about one inch in diameter and immersed in a super saturated solution of sodium chloride. After two hours the gluten had become hard on the surface and was broken up in smaller chips and re-immersed in the salt solution for 24 hours. These chips were then ground into small particles in a meat grinder and the resulting particles were non-cohesive and were stable against bacterial or mold action. A sample after storage for two weeks had not become rancid, darkened, putrified, or denatured.

After being ground in a mill with a coarse screen to smaller beads, the partially dehydrated gluten prepared as described above contained approximately 41% moisture. These beads were further pulverized in a hammer mill until a fine powder was obtained.

This powder contained 15.4% ash on a moisture free basis. After air drying for 12 hours, a light colored vital gluten was obtained which reconstituted with water very rapidly to its original elastic and cohesive state. This indicated that no denaturation of the gluten occurred during the various process steps.

*Example II*

Gluten beads having 41% moisture and obtained from the mill in the manner shown in Example I were dried in a forced hot air oven at 75° C. for one hour. This vital gluten also showed no signs of denaturation.

*Example III*

Wet native gluten was partially dehydrated in a super saturated salt solution in the manner shown in Example I. Upon removal from the salt solution it was rolled pressed to remove part of the remaining salt solution. The partially dehydrated gluten obtained analyzed 37.6% moisture and 14.2% ash on a moisture free basis.

*Example IV*

The following mixture was allowed to stand for 20 hours at room temperature.

| | Lbs. |
|---|---|
| Wet native gluten (66% moisture) [1] | 24.5 |
| Sodium chloride (solid) | 10 |
| Water | 20 |

[1] Ground in a meat grinder with a hamburger die prior to immersion.

Upon removal from the salt solution, the partially dehydrated gluten was pressed through a steel roll. The pressed gluten contained 37% moisture.

A portion of the gluten prepared as shown above was dried in a forced hot air oven at 75° C. for one hour. The resulting vital gluten showed no signs of denaturation.

A second portion was placed on a screen tray and dried in a hot air oven for 13 minutes at which time its moisture content was reduced to 25%. It was then ground through a 12" hammer mill, and the resulting powder contained 17% moisture. This powder was then reground in a 6" hammer mill thereby reducing the moisture level to 11% and contained 13.4% ash on a moisture free basis of which 12% was sodium chloride.

The final vital gluten powder was reconstituted with water to form wet gluten having substantially the same physical characteristics as the original gluten.

*Example V*

Wet native wheat gluten, 800 gm., was kneaded with 180 gm. of granular sodium chloride for 10 minutes. The gluten became hard and broke into smaller particles. The particles were pressed to remove a portion of the brine solution contained therein. This partially dried gluten was further dried at 50° C. The final product contained 20% ash on a moisture free basis and reconstituted with water rapidly to form a product substantially the same as original gluten.

*Example VI*

Wet native wheat gluten, 800 gm., was kneaded with 120 gms. of sodium chloride for 30 minutes and then pressed to remove a portion of the brine solution contained therein. This partially dehydrated gluten was then ground to reduce the particle size and moiture which at the end of the grinding step was 39.2%. The ground gluten was dried in a hot air tumbler drier at 60° C. for 20 minutes which reduced the moisture content to 20.2%. The gluten was then puverized in a hammer mill to yield a powdered gluten containing 5.5% moisture and 14.5% ash on a moisture free basis. The final vital gluten was reconstituted with water to form wet gluten having substantially the same physical characteristics as native gluten.

Stability tests were conducted on a sample of the product prepared in accordance with the above procedure and at the end of 5 months there was no evidence of rancidity or denaturation.

As will be appreciated from the above examples either a concentrated solution of sodium chloride or solid sodium chloride may be employed to effect the initial dehydration of the wet native wheat gluten. In regard to the use of a concentrated solution it has been observed that solutions containing as low as 18% by weight of sodium chloride are satisfactory. At the same time it should be noted that the use of pure salt facilitates the dehydration and is accordingly the preferred method.

Many modifications and variations of the invention as hereinbefore set forth may be made without departing from the spirit and scope thereof, and therefore only such limitations should be imposed as are indicated in the appended claims.

Now, therefore, we claim:

1. In the process for the preparation of vital gluten, the steps comprising separating wheat flour into wheat starch and native wet gluten, partially dehydrating the wet gluten by contact with sodium chloride until the isotonic point is substantially reached to produce a partially dried gluten which is non-tacky, and air-drying solely the partially dried non-tacky gluten to obtain vital gluten which may be reconstituted with water to form wet gluten having substantially the same physical characteristics as the native wet gluten.

2. In the process for the preparation of vital gluten, the steps comprising separating wheat flour into wheat starch and native wet gluten, partially dehydrating the wet gluten by contacting it with a concentrated sodium chloride solution until the isotonic point is substantially reached to produce a partially dried gluten which is non-tacky, and air-drying solely the partially dried non-tacky gluten to obtain vital gluten which may be reconstituted with water to form wet gluten having substantially the same physical characteristics as the native wet gluten.

References Cited in the file of this patent

UNITED STATES PATENTS 2,559,551     Weber _____ July 3, 1951

OTHER REFERENCES

Tullis: Blood Cells and Plasma Proteins, pp. 212–214 (1953), Academic Press Inc., New York.